UNITED STATES PATENT OFFICE.

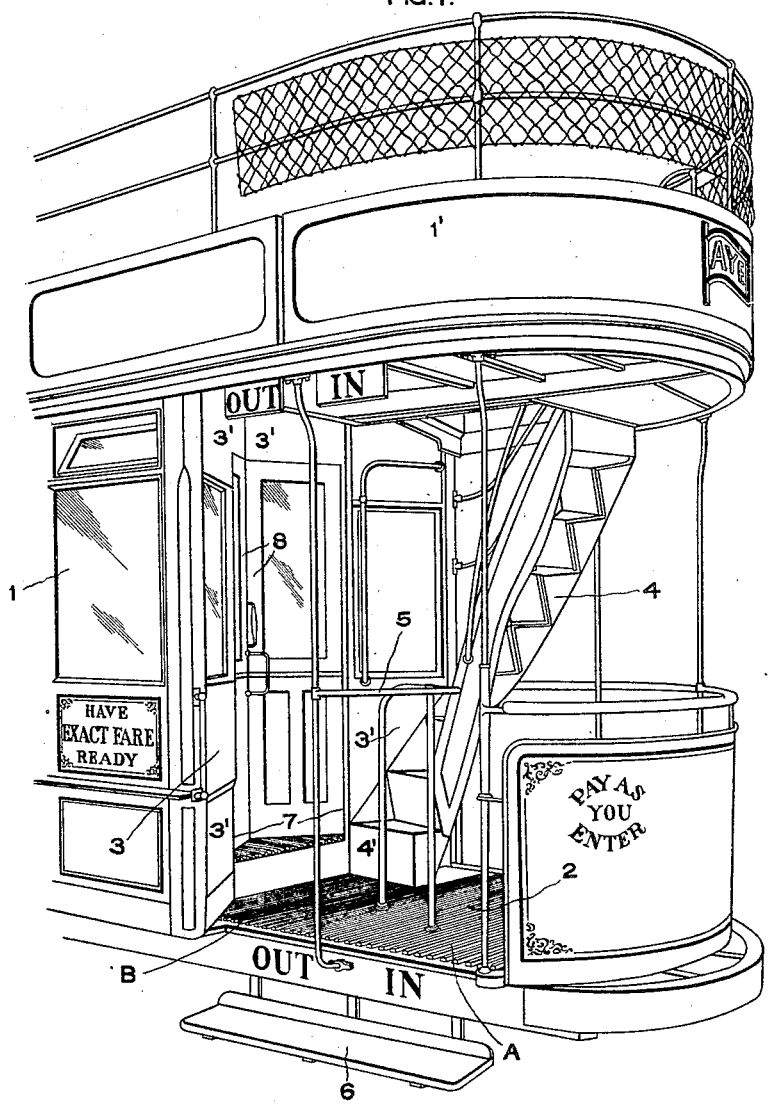

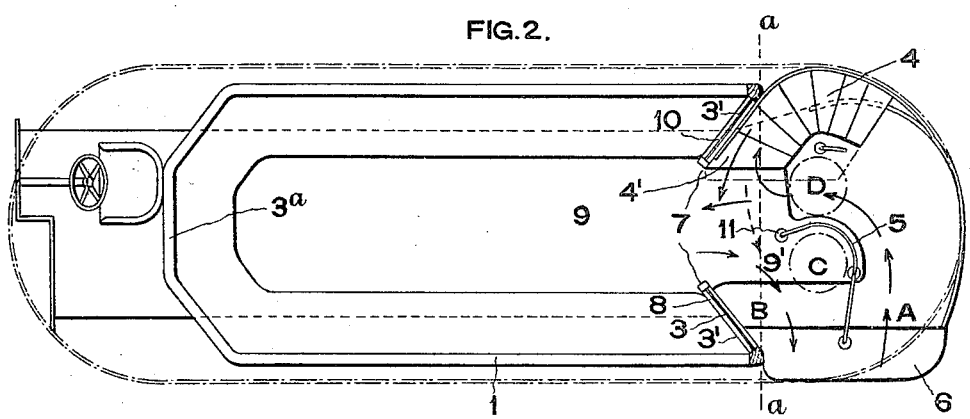
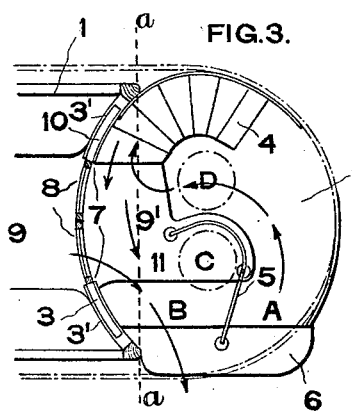
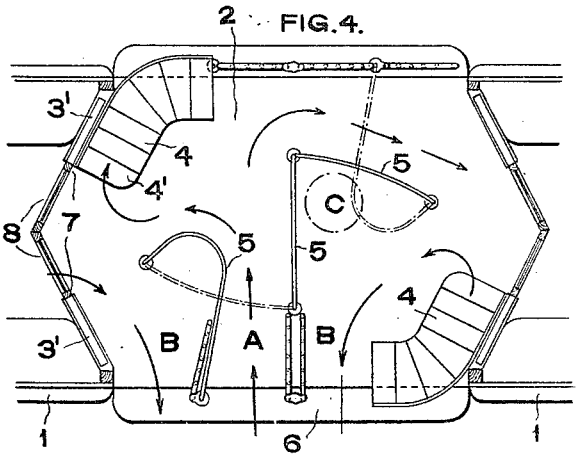
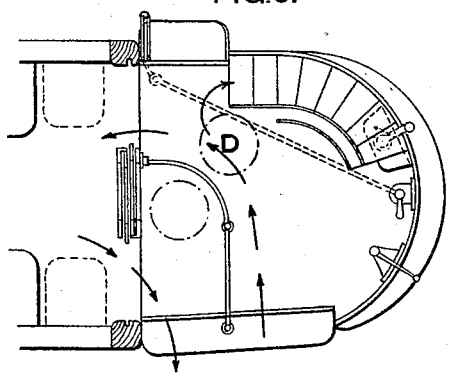
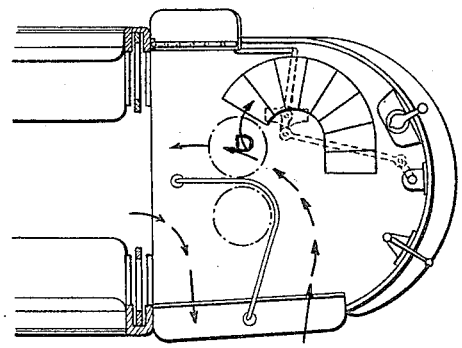

ARNOLD JAMES TANNER, OF LONDON, ENGLAND, ASSIGNOR TO PREPAYMENT CAR SALES COMPANY, OF NEW YORK, N. Y., A CORPORATION OF WEST VIRGINIA.

PASSENGER-VEHICLE.

1,133,678.  Specification of Letters Patent.  Patented Mar. 30, 1915.

Application filed June 10, 1913. Serial No. 772,739.

*To all whom it may concern:*

Be it known that I, ARNOLD JAMES TANNER, a citizen of the United States of America, residing at London, England, have invented new and useful Improvements in Passenger-Vehicles, of which the following is a specification.

This invention relates to the construction of tramcars, omnibuses, and other passenger vehicles, and the object of the invention is to provide a vehicle of an improved structure having means whereby the ingress and egress of passengers can be more effectively controlled, and these means are particularly applicable to vehicles used in a tramway or omnibus service where a so-called prepayment system of fare collection is employed.

Heretofore it has been proposed to employ a barrier or guide rail on the platform to divide the same into ingress and egress passageways or spaces and on one side of the platform the usual combined entrance and exit step is provided and on the opposite side an additional exit and step is located, such exit on the front platform being used by outgoing passengers usually those coming down the stairway leading from the top deck of the vehicle. Generally with tramcars and omnibuses now in use, when a prepayment system of fare collection is adopted, it is necessary to lengthen the platform to accommodate a greater number of passengers than ordinarily so as to facilitate the practical carrying out of the said system of collection. The lengthening of the platform of an old car is frequently inconvenient, for example, with a vehicle having a short wheel base, the additional overhang caused by lengthening the platform, will overbalance the vehicle on its supporting truck or chassis and thereby cause rocking. The remedy to overcome this defect would be to also lengthen the wheel base of the vehicle, which in the case with existing vehicles, can only be done at considerable expense by re-constructing the supporting truck or chassis. Further, with double deck vehicles now in use, the location of the stairway on the platform is such that it renders it necessary to provide an extra exit on the front platform for the downcoming passengers, the reason being that passengers coming down from the upper deck on to the rear or loading platform meet the incoming passengers going in an opposite direction and consequently the passages are obstructed.

By means of part of the present invention hereinafter described a construction is provided which while it is useful for various types of new cars in general, it is particularly useful and advantageous when converting existing cars, for with this construction the difficulties heretofore attending the alteration of a car to render the same applicable for a prepayment system of fare collection are non-existent.

In accordance with the invention the improved construction consists of a car body having a platform with an intervening bulkhead, this bulkhead extending inwardly and longitudinally toward the inclosed interior or saloon of the car and this bulkhead is provided with the usual opening or doorway having a door or doors therefor if required.

Other features of the invention are found in connection with the construction, and location of the stairway leading from the platform to the upper deck of the car, and in the formation of entrance and exit passages leading to and from the stairway and the opening in the bulkhead.

In order that the invention may be more clearly understood reference is made to the accompanying drawings, in which—

Figure 1 is a perspective view of the rear end of a tramcar having the improvements embodied therein; Fig. 2 is a plan view showing the lower deck of an omnibus or tramcar having a platform with a stairway situated thereon, the construction and arrangement being in accordance with one form of the invention; Fig. 3 is a plan view of an omnibus showing a modified form of bulkhead; Fig. 4 is a plan view of the platform of a central entrance tramcar embodying the improvements, and Figs. 5 and 6 are plan views of previously proposed constructions, the purpose of these figures being to illustrate by comparison the advantage obtained by means of the invention hereinafter to be described.

Referring to Fig. 1 of the drawings, 1 is the car body having a platform 2, with an intervening bulkhead 3, and a stairway 4 situated on the off or far side of the platform. 5 is a guide rail or barrier employed to define the ingress and egress passageways A and B on the platform, the near side of the platform being open to allow ingress and egress of the passengers by means of the step 6. The bulkhead 3 is formed by angularly disposed partitions $3^1$ extending inwardly toward the interior of the car. A doorway 7 is formed between the partitions $3^1$, and this doorway can be opened or closed by the doors 8, these doors being set in angular positions and shaped so as to correspond with the position and shape of the partitions and to be capable of sliding into pockets provided within or behind these partitions. The lower step $4^1$ of the stairway 4 is in close proximity to the far side of the opening in the bulkhead and in the embodiments illustrated part of the stairway fits closely up against one of the angular partitions of the bulkhead, the shape of the bulkhead being such that the stairway entirely fills the space taken up and further the stairway is caused to partially turn before it reaches the landing on the top deck $1^1$, near the end of the car.

Referring now to Fig. 2 illustrating a construction suitable for an omnibus; in this embodiment of the invention the platform, bulkhead and stairway construction and arrangement are as previously described with the exception that the platform is reduced to the minimum length and the flooring 9 of the interior of the car is extended outwardly at $9^1$ on the platform, so as to provide an elevation from which the stairway starts, thus lessening the number of steps and the length of the stairway. The elevation $9^1$ also serves to raise the conductor's station. The interior of the omnibus is provided with seats extending around the sides and the front end thereof, and the forward bulkhead $3^a$ projects outwardly and is shaped to correspond with the bulkhead at the rear end of the vehicle, thereby the knee room for the passengers on the seats in the interior of the vehicle is not lessened.

Fig. 3 shows the end of a vehicle having a platform arrangement similar to that previously described but in this instance the bulkheads are curved inwardly and the doors when used for opening and closing the doorway are of a corresponding shape so that the doors may slide into the pockets 10 when opened. The construction of the platform and arrangement illustrated in Figs. 2 and 3 is also suitable for a tramcar of the ordinary single or double ended types.

Fig. 4 shows a platform arrangement for a central entrance car, and in this instance the construction is the same as illustrated in Fig. 1, only the bulkhead and stairway are duplicated, and in order that the car may be run in reverse directions entrance and exit steps are provided on both sides of the platform and a reversible barrier or guide rail is employed, so that the position of the same may be changed over as required.

For the purpose of comparison only reference will now be made to Figs. 5 and 6 illustrating previously proposed constructions and which are not a part of the present invention. It must however, first be pointed out that the various figures, from 2 to 6 inclusive, are drawn on the same scale and the length of the platform in Figs. 2 and 3 is approximately four feet three inches, taking the measurement from the line a—a to the end of the platform, whereas the platforms illustrated in Figs. 5 and 6 are approximately six feet in length. It must be taken into consideration that for a prepayment system of fare collection, to accelerate the service, it is desirable to take on as many passengers as possible and then these passengers may congregate on the platform and await their turn to pass the pay point which is represented by the dotted circle D. By comparison of the various figures of the drawings it will be observed that the loading capacity of the improved platform illustrated in Figs. 2 and 3 is about equal to that of the platform illustrated in Figs. 5 and 6 notwithstanding that the improved platform is considerably shorter. With the improved platform, when used on a double ended tramcar, the motorman or driver, stationed on the front platform, has a clear space wherein he can operate the various mechanisms for controlling the running of the car, and besides he has a clear vision from both sides of the car, whereas in the previously proposed constructions his space is more limited and his vision is somewhat obstructed.

Another disadvantage found with earlier constructions is, to successfully employ the prepayment system of fare collection it is necessary to provide a platform at both ends of the vehicle and the outgoing passengers from the upper deck must leave the car at the front platform under observation of the motorman. Extra duties are then imposed upon the motorman, if the fares are to be checked in accordance with the prepayment system, and the motorman must attend to this checking, therefore, for this reason alone, the exit by means of the front platform is not generally permissible. It must also be taken into consideration, still referring to the old constructions, that the purpose of dividing the platform into ingress and egress passageways is defeated when the outgoing passengers from the top deck leave the car at the loading platform, for naturally these passengers will take the shortest and straightest passage to reach the exit and with the old constructions, this passage would be through the entrance space; and if an incoming passenger were standing at the point D, he would obstruct the passage, consequently the outgoing passengers would then have to traverse a roundabout course through the interior of the car and then out again to reach the exit side of the step.

In accordance with the improved construction, the space on the platform is increased by constructing the bulkhead in the manner illustrated; further, by ending the guide rail at the stanchion 11 located centrally relatively to but away from said opening, a space between the said stanchion and the sides of the opening is provided of the maximum width so as to allow passengers to pass freely in and out of the interior of the car. Further, with this platform arrangement and by placing the stairway in close proximity to the bulkhead, on the far side of the platform, with the bottom step located adjacent to one side of the doorway or opening in the bulkhead, and in direct line with the exit step, passengers from the top deck desiring to leave the car, are directed to and are able to use the shortest and most convenient passage leading to the exit step at the side of the platform. In this case even if one or more incoming passengers are awaiting their turn to pass the pay point, the said exit passage will not be obstructed.

As will be more clearly observed in Fig. 1 the entire space on the car platform constructed and arranged in accordance with the invention, is available, for under the lower steps luggage and parcels can be stored and under the steps higher up a passenger not having his fare ready may find a convenient place to step out of the way of the other incoming passengers.

It must be apparent from the foregoing description that the essential feature of the invention is the provision of the inwardly extending bulkhead thereby lengthening the platform inwardly, but it must be understood, where it is practical to lengthen the platform outwardly, the ordinary straight bulkhead may be retained and still the other features of the invention in connection with the arrangement of the stairway and the entrance and exit passages leading to and from the stairway and the opening in the bulkhead may be employed with great advantage.

I claim:

1. A passenger vehicle having a body portion, a platform, an intervening angular or curved shaped bulkhead extending inwardly and longitudinally toward the inclosed interior or saloon of the vehicle, a centrally located opening in said bulkhead and a barrier or guide rail mounted on the platform extending from the platform steps to a point approximately central but away from the opening.

2. A passenger vehicle having a body portion, a platform, an intervening angular or curved shaped bulkhead extending inwardly and longitudinally toward the inclosed interior or saloon of the vehicle, a centrally located opening in said bulkhead, a barrier or guide rail mounted on the platform extending from the platform steps to a point approximately central but away from the opening, and a stairway situated at one side of the platform, the bottom step of the stairway being in close proximity to one side of the opening in the bulkhead and facing a defined exit passage leading to the exit step at the opposite side of the platform.

3. A passenger vehicle having a body portion, a platform, a bulkhead intervening between the body portion and the platform, a rail mounted on the platform defining separate exit and entrance spaces and a conductor's station on the platform, said station being elevated by means of an extension of the flooring of the interior of the car, and a stairway situated in close proximity to one side of the bulkhead, the lower step of the stairway being directly in line with the exit from said platform.

4. A passenger vehicle having a body portion, a platform, an intervening bulkhead provided with a centrally located doorway, a rail mounted on the platform and extending partially across the same for defining separated entrance and exit spaces or passages on the platform, a stairway situated on one side of the platform within the entrance space in close proximity to the said bulkhead, the bottom step of the stairway facing the exit passage leading from said step to the exit step at the opposite side of the platform.

5. A passenger vehicle having a body portion and a platform with an intervening bulkhead, a rail on the platform for defining separate ingress and egress spaces thereon and establishing a conductor's position, a stairway situated within the entrance space on the platform in close proximity to the said bulkhead, and a defined exit passage between the bulkhead and the end of the said rail, said exit passage leading from the bottom step of the stairway to the exit step on the opposite side of the platform.

In testimony whereof I have hereunto set my hand in the presence of the subscribing witnesses, on this 22nd day of May, A. D., 1913.

ARNOLD JAMES TANNER.

Witnesses:
  LEONARD S. POCOCK,
  ROY KING.